US012539614B2

(12) United States Patent
Ogawa et al.

(10) Patent No.: US 12,539,614 B2
(45) Date of Patent: Feb. 3, 2026

(54) REMOTE SUPPORT SYSTEM

(71) Applicant: FANUC CORPORATION, Yamanashi (JP)

(72) Inventors: Shuuhei Ogawa, Yamanashi (JP); Tomonori Arai, Yamanashi (JP); Norimichi Yoshida, Yamanashi (JP); Seigo Kato, Yamanashi (JP); Kenichiro Abe, Yamanashi (JP); Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 18/290,318

(22) PCT Filed: Dec. 2, 2021

(86) PCT No.: PCT/JP2021/044254
§ 371 (c)(1),
(2) Date: Nov. 13, 2023

(87) PCT Pub. No.: WO2022/259572
PCT Pub. Date: Dec. 15, 2022

(65) Prior Publication Data
US 2024/0261972 A1    Aug. 8, 2024

(30) Foreign Application Priority Data

Jun. 9, 2021    (WO) .................. PCT/JP2021/021884

(51) Int. Cl.
*B25J 9/16*    (2006.01)
*B25J 19/02*    (2006.01)

(52) U.S. Cl.
CPC ........... *B25J 9/1689* (2013.01); *B25J 19/023* (2013.01)

(58) Field of Classification Search
CPC ........ B25J 9/1689; B25J 19/023; B25J 19/06; G06F 21/305; G06F 21/6218; G05B 19/406; G05B 2219/32235
See application file for complete search history.

(56) References Cited

U.S. PATENT DOCUMENTS 5,876,325 A * 3/1999 Mizuno .................. A61B 34/37
600/117
6,256,556 B1    7/2001 Zenke
(Continued)

FOREIGN PATENT DOCUMENTS

| JP | 2001-142512 A | 5/2001 |
| JP | 2021-58982 A | 4/2021 |
| WO | 2017/169144 A1 | 10/2017 |

OTHER PUBLICATIONS

International Search Report issued in PCT/JP2021/044254 mailed on Feb. 15, 2022 with English Translation (5 pages).
(Continued)

*Primary Examiner* — Bhavesh V Amin
(74) *Attorney, Agent, or Firm* — HAUPTMAN HAM, LLP

(57) ABSTRACT

Provided is a remote support system with a higher level of safety. The remote support system includes a control device configured to control an industrial machine, a first information processing terminal connected to the control device, and one or more second information processing terminals capable of controlling the first information processing terminal. The control device is controllable from one or more second information processing terminals.

14 Claims, 12 Drawing Sheets

(56) References Cited

U.S. PATENT DOCUMENTS

| | | | | |
|---|---|---|---|---|
| 6,677,858 B1* | 1/2004 | Faris | | H04L 67/52 |
| | | | | 701/472 |
| 6,837,883 B2* | 1/2005 | Moll | | G16H 40/63 |
| | | | | 606/1 |
| 6,968,905 B2* | 11/2005 | Adnan | | G05B 15/02 |
| | | | | 701/2 |
| 7,087,049 B2* | 8/2006 | Nowlin | | A61B 34/35 |
| | | | | 606/1 |
| 8,634,960 B2* | 1/2014 | Sandin | | B60L 50/62 |
| | | | | 700/258 |
| 9,636,827 B2* | 5/2017 | Sato | | B25J 13/088 |
| 9,684,299 B2* | 6/2017 | Chung | | G05B 19/408 |
| 10,185,670 B2* | 1/2019 | Litichever | | G06F 13/107 |
| 10,733,116 B2* | 8/2020 | Litichever | | G06F 21/82 |
| 10,739,760 B2* | 8/2020 | Ogawa | | G05B 19/41815 |
| 10,955,833 B2* | 3/2021 | Bandekar | | G05B 19/41835 |
| 11,243,676 B2* | 2/2022 | Fujitsuka | | G06F 3/04886 |
| 11,399,995 B2* | 8/2022 | Coulter | | G16H 20/30 |
| 11,498,209 B2* | 11/2022 | Fujisawa | | B25J 9/163 |
| 11,537,533 B2* | 12/2022 | Litichever | | G06F 21/82 |
| 11,644,826 B2* | 5/2023 | Namikoshi | | G05B 23/0264 |
| | | | | 702/187 |
| 12,032,495 B2* | 7/2024 | Litichever | | G06F 13/107 |
| 2003/0093187 A1* | 5/2003 | Walker | | B64D 45/0059 |
| | | | | 701/1 |
| 2003/0216715 A1* | 11/2003 | Moll | | A61B 34/37 |
| | | | | 606/1 |
| 2004/0199280 A1* | 10/2004 | Silverbrook | | G06K 7/10722 |
| | | | | 700/95 |
| 2005/0052148 A1* | 3/2005 | Carlson | | B25J 13/02 |
| | | | | 318/568.11 |
| 2006/0026017 A1* | 2/2006 | Walker | | H04L 63/302 |
| | | | | 701/31.4 |
| 2006/0058929 A1* | 3/2006 | Fossen | | G05B 23/0256 |
| | | | | 701/21 |
| 2006/0206246 A1* | 9/2006 | Walker | | H04L 63/302 |
| | | | | 701/16 |
| 2007/0239120 A1* | 10/2007 | Brock | | A61B 34/20 |
| | | | | 604/272 |
| 2008/0307240 A1* | 12/2008 | Dahan | | G06F 1/324 |
| | | | | 713/320 |
| 2010/0274087 A1* | 10/2010 | Diolaiti | | A61B 34/30 |
| | | | | 600/407 |
| 2012/0166582 A1* | 6/2012 | Binder | | H04L 63/0281 |
| | | | | 709/217 |
| 2013/0104251 A1* | 4/2013 | Moore | | G06F 21/602 |
| | | | | 726/30 |
| 2014/0282586 A1* | 9/2014 | Shear | | G06F 16/245 |
| | | | | 718/104 |
| 2015/0067819 A1* | 3/2015 | Shribman | | H04L 63/029 |
| | | | | 709/218 |
| 2016/0034305 A1* | 2/2016 | Shear | | G06F 9/50 |
| | | | | 707/722 |
| 2017/0098022 A1* | 4/2017 | Kephart | | G05B 17/02 |
| 2018/0113430 A1* | 4/2018 | Naidoo | | G05B 19/052 |
| 2018/0154518 A1* | 6/2018 | Rossano | | B25J 9/1671 |
| 2018/0193172 A1* | 7/2018 | Smith | | A61F 2/70 |
| 2018/0225230 A1* | 8/2018 | Litichever | | G06F 21/56 |
| 2019/0087359 A1* | 3/2019 | Litichever | | G06F 21/56 |
| 2019/0109836 A1 | 4/2019 | Sato et al. | | |
| 2019/0260204 A1* | 8/2019 | Koval | | H02J 3/003 |
| 2019/0369608 A1* | 12/2019 | Bandekar | | G05B 19/41885 |
| 2019/0385057 A1* | 12/2019 | Litichever | | G06N 3/08 |
| 2020/0039066 A1* | 2/2020 | Oguri | | G06T 7/73 |
| 2020/0113641 A1* | 4/2020 | Itkowitz | | A61B 90/98 |
| 2020/0227178 A1* | 7/2020 | Lombardi | | G06N 20/00 |
| 2020/0320023 A1* | 10/2020 | Litichever | | G06F 21/82 |
| 2020/0333767 A1* | 10/2020 | Engelstein | | H04Q 9/00 |
| 2021/0358032 A1* | 11/2021 | Cella | | G06F 18/241 |
| 2022/0187847 A1* | 6/2022 | Cella | | G05B 19/41885 |
| 2022/0197306 A1* | 6/2022 | Cella | | G06N 20/10 |
| 2023/0010975 A1* | 1/2023 | Kamon | | G05B 19/409 |
| 2023/0110275 A1* | 4/2023 | Litichever | | G06F 13/4282 |
| | | | | 710/62 |

OTHER PUBLICATIONS

Written Opinion of International Searching Authority issued in PCT/JP2021/044254 mailed on Feb. 15, 2022 with English Translation (8 pages).

* cited by examiner

REMOTE SUPPORT SYSTEM

TECHNICAL FIELD

The present invention relates to a remote support system.

BACKGROUND ART

In recent years, high function industrial machines, such as robots and machine tools, have been increasingly introduced into manufacturing factories. For example, a robot is provided with a dedicated operation device, and the user can intuitively teach an operation to the robot by operating the operation device. On the other hand, a robot can be connected to a general-purpose information processing terminal, such as a PC or a tablet, and by connecting the robot to the PC, the user can confirm or change the setting data of the robot without using a dedicated operation device.

However, there are cases in which a worker at the site alone cannot cope with an unexpected situation, such as a situation in which the robot stops and remains stopped. In such cases, a worker on site contacts a person in charge of the robot manufacturer by e-mail, telephone, etc., and operates the robot as instructed by the person in charge. If the problem still cannot be solved, a technician from the robot manufacturer will directly visit and operate the robot. If the technician from the robot manufacturer cannot visit the site immediately, the robot will be out of service for a long period of time, causing a delay in the manufacturing schedule. To solve this problem, Patent Literature 1 discloses a remote operation system for realizing support by a service person when a trouble occurs in a robot.

CITATION LIST

Patent Literature

Patent Literature 1: Japanese Unexamined Patent Application Publication No. 2001-142512

DETAILED DESCRIPTION OF THE INVENTION

Figure 1:
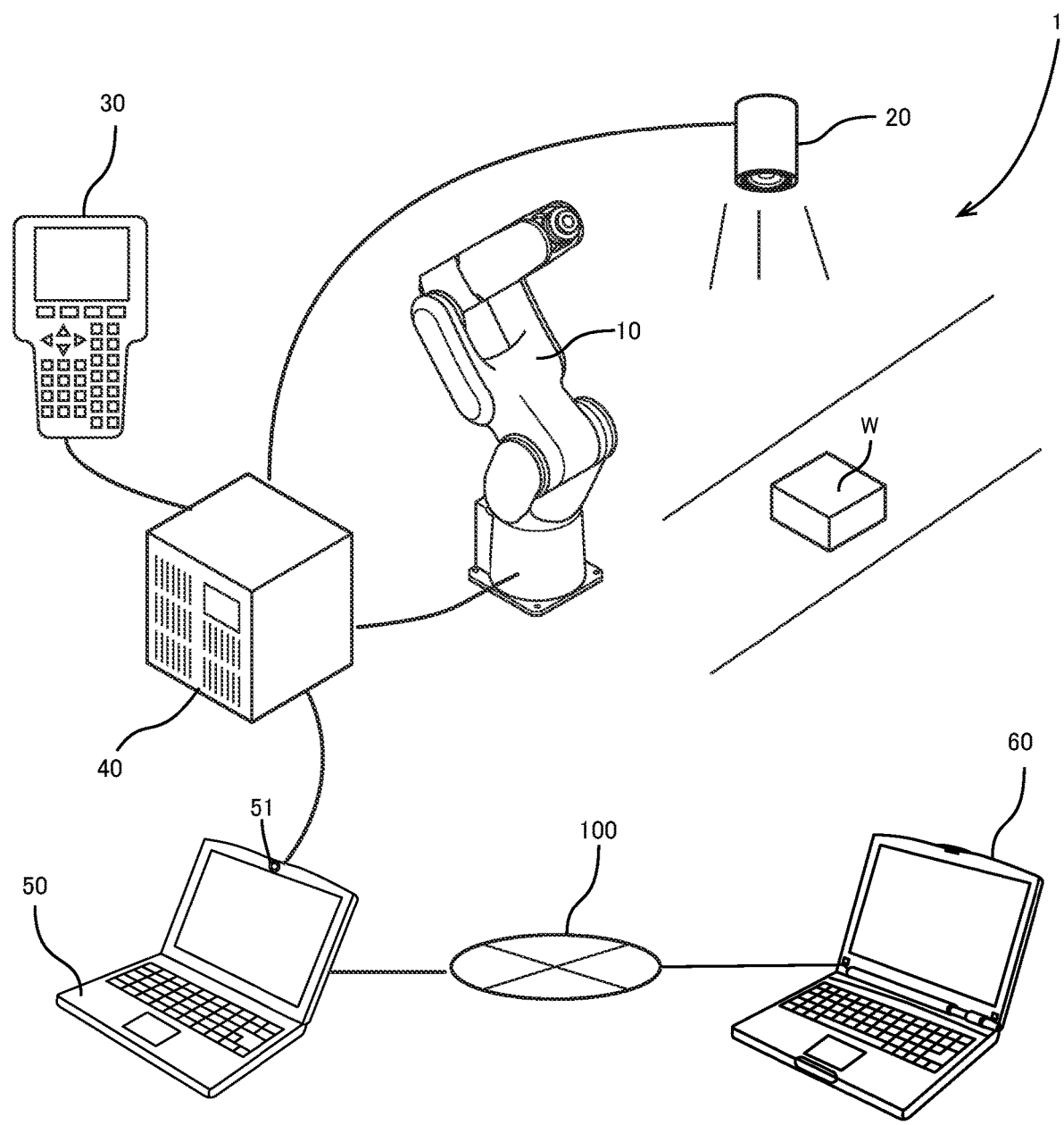
FIG. 1 is a diagram showing an example of a remote support system according to the present embodiment.

A remote support system according to one aspect of the present disclosure includes a control device configured to control an industrial machine, a first information processing terminal connected to the control device, and one or more second information processing terminals capable of controlling the first information processing terminal. The control device can be controlled from one or more second information processing terminals.

Hereinafter, a remote support system according to an embodiment of the present invention will be described with reference to the drawings. In the following description, constituent elements having substantially the same function and configuration are denoted by the same reference numeral, and repetitive descriptions will be given only where necessary.

As shown in FIG. 1, a remote support system 1 according to the present embodiment includes a robot arm mechanism 10 installed in a factory, a camera 20 that captures an image of a workpiece W, a control device 40 that controls the robot arm mechanism 10 and the camera 20, a dedicated operation pendant 30 for operating the robot arm mechanism 10, a first information processing terminal 50 (user terminal 50) such as a PC or a tablet operated by a worker (user) in the factory, and a second information processing terminal 60 (technician terminal 60) such as a PC or a tablet operated by a technician of a robot manufacturer or a technician of a maintenance company entrusted by the robot manufacturer in a remote location. Typically, the operation pendant 30 and the user terminal 50 are connected to the control device 40 by a wired cable. The technician terminal 60 is connected to the user terminal 50 via an external network 100 such as the Internet in such a manner that data communication is possible. The operation pendant 30 and the user terminal 50 may be connected to each other via a local area network including the control device 40 by wire or wirelessly in such a manner that data communication is possible. The robot arm mechanism 10, the camera 20, and the control device 40 constitute a robot system.

Figure 2:
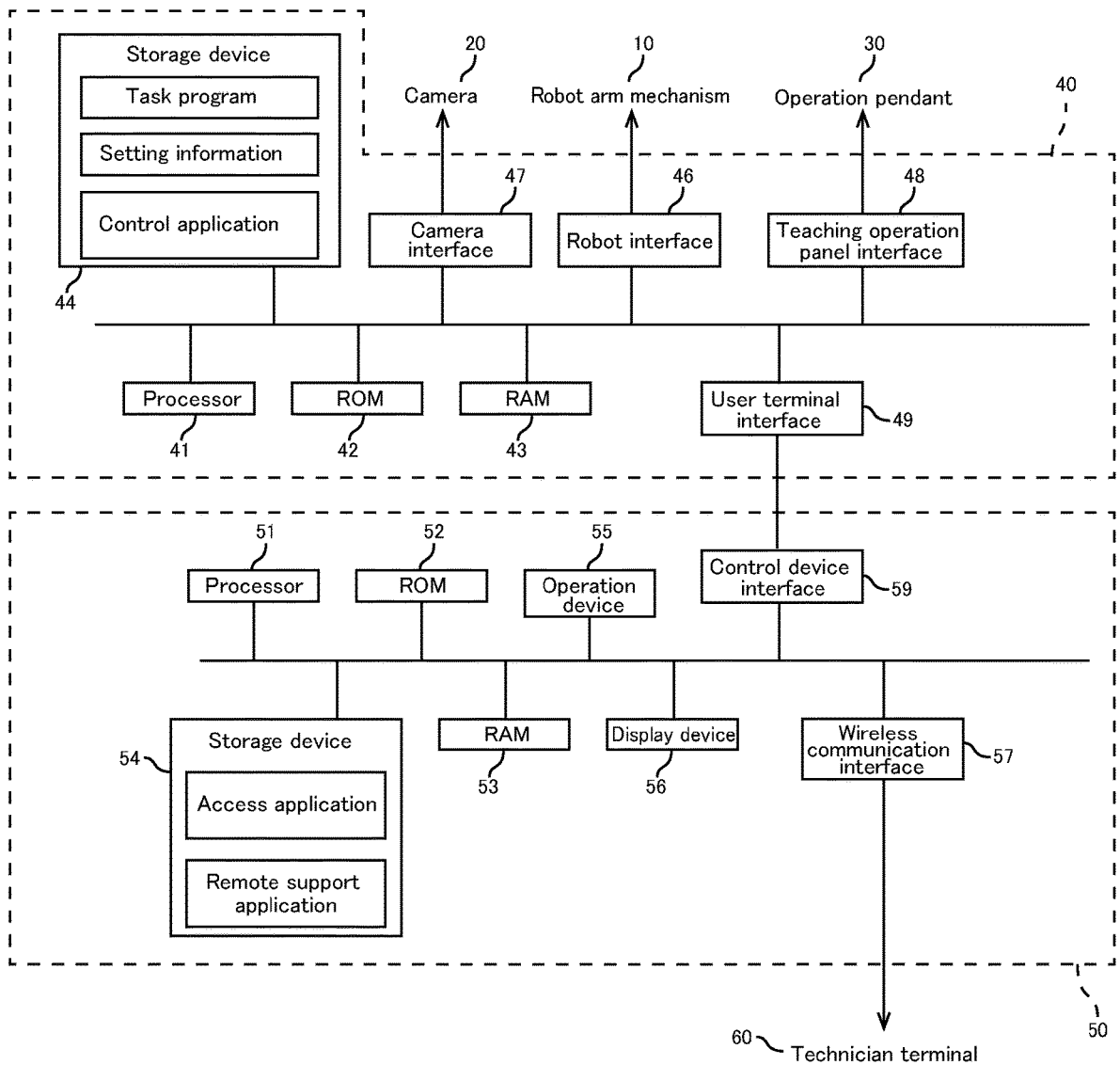
FIG. 2 is a block configuration diagram of the remote support system shown in FIG. 1.

As shown in FIG. 2, the robot arm mechanism 10, the camera 20, the operation pendant 30, and the user terminal 50 are connected to the control device 40 via interfaces 46, 47, 48, and 49. The control device 40 includes a processor 41. The processor 41 is constituted by a central processing unit (CPU), a graphics processing unit (GPU), and the like, and performs overall control of the devices and controllers connected to a system bus. A ROM 42 stores a basic input output system (BIOS), an operating system program (OS), and the like executed by the processor 41. A RAM 43 functions as a main memory a work area, or the like of the processor 41. A storage device 44 stores various programs, various types of setting information, and the like. Specifically the storage device 44 stores information on the robot system. The information on the robot system includes task programs for causing the robot arm mechanism 10 and the camera 20 to execute predetermined tasks, setting information of the robot arm mechanism 10, and setting information of the camera 20. The setting information of the robot arm mechanism 10 includes, for example, various types of parameter information related to control of the robot arm mechanism 10, such as the motion speed, acceleration, and motion range of the robot arm mechanism 10, on/off information of functions, and the like. The setting information of the camera 20 includes a shooting range, a shooting speed, and the like. The storage device 44 also stores control applications for controlling the robot arm mechanism 10 and the camera 20 by operating an external terminal. The control here includes operation control of the motors of respective joints of the robot arm mechanism 10, correction of task programs, and change of setting information. By the processor 41 executing a control application, the control device 40 can provide a control page to the user terminal 50 that has accessed the control device 40, and can correct or change data on the robot system, such as correcting a task program, changing setting information, or the like, based on data input from the user terminal 50 via the control page.

The user terminal 50 is connected to the control device 40 through a control device interface 59. The user terminal 50 includes a processor 51. The processor 51 is constituted by a central processing unit (CPU), a graphics processing unit (GPU), and the like, and performs overall control of the devices and controllers, such as an operation device 55 and a display device 56, connected to a system bus. A ROM 52 stores a basic input output system (BIOS), an operating system program (OS), and the like executed by the processor 51. A RAM 53 functions as a main memory a work area, or the like of the processor 51. A storage device 54 stores various programs, various types of setting information, and the like.

Specifically the storage device 54 stores an access application for accessing the control device 40. As the access application, an existing application, such as a browser, can be used. By activating the browser on the user terminal 50 and designating the control device 40 to be controlled, a control page of the control device 40 can be displayed on the browser. The user can control the control device 40 via the control page displayed on the user terminal 50 to update data held by the control device 40, such as correcting a task program or changing setting information. The access application is not limited to a browser, and may be a dedicated application, as long as it allows access to the control page provided by the control device 40.

The storage device 54 stores a remote support application for using remote support service. As the remote support application, an existing application such as Skype can be used. The user can make a voice or video call with a technician by activating Skype and providing predetermined instructions. Furthermore, it is possible to transfer the operation right of the user terminal 50 and the viewing right of the display screen of the user terminal 50 to the technician terminal 60. The remote support application may be a remote desktop or the like built into Windows as long as the operation right and the viewing right of the user terminal 50 can be transferred to the technician terminal 60. Further, the remote support application may be software capable of transferring only one of the operation right and the viewing right.

Figure 3:
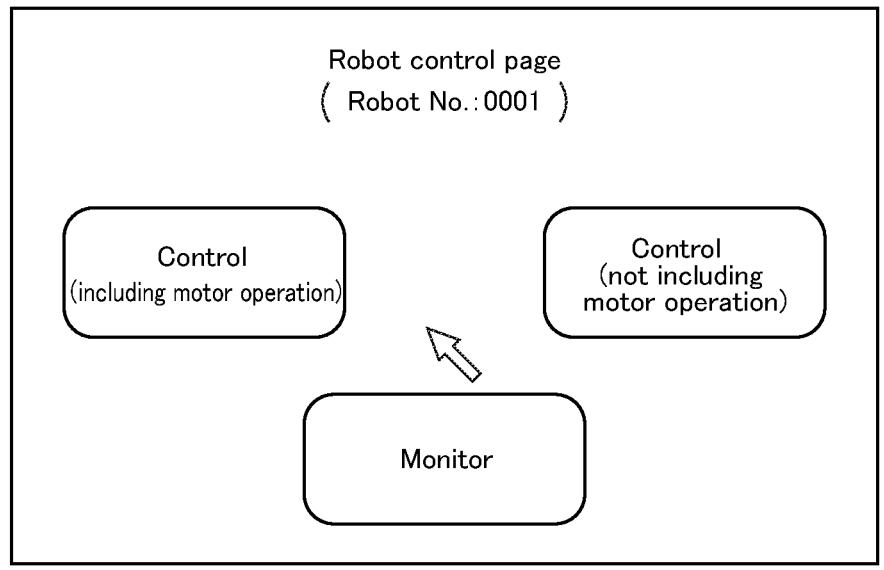
FIG. 3 is a screen for selecting a mode of control of a control device, which is displayed on a user terminal shown in FIG. 1.

FIG. 3 shows an example of a screen for selecting a mode of control, which is displayed on the user terminal 50 that has accessed the control device 40. The screen for selecting a mode of control corresponds to the top page of the control page. The remote support system 1 according to the present embodiment has three modes of control with different control ranges for the control device 40. As shown in FIG. 3, three modes of control are provided: "control (including motor operation)", "control (not including motor operation)", and "monitor".

When "control (including motor operation)" is selected as the mode of control, the control right (first control right) of the control device 40 which allows control of the operation of the motors of the robot arm mechanism 10 is granted to the user terminal 50. A control page corresponding to the first control right is displayed on the user terminal 50. In the control page corresponding to the first control right, the following operations (controls) can be performed:

Confirmation of the contents of an alarm, such as an abnormality or a warning, occurring in the robot system Confirmation of input/output states of the robot arm mechanism 10 and the camera 20

Confirmation and change of various types of setting information related to the robot arm mechanism 10 and the camera 20, and switching between enabling and disabling of functions Confirmation and change of task programs (robot control program and camera 20 control program)

Backup acquisition of the control device 40 (saving of task programs, setting information, and image files in the internal memory of the control device 40)

Operation control of the motors of the robot arm mechanism 10

When "control (not including motor operation)" is selected as the mode of control, the control right (second control right) of the control device 40 that does not allow control of the operation of the motors is granted to the user terminal 50. A control page corresponding to the second control right is displayed on the user terminal 50. In the control page corresponding to the second control right, operations (controls) other than the "Operation control of the motors of the robot arm mechanism 10" among the controls allowed by the first control right can be performed.

When "monitor" is selected as the mode of control, the viewing right of the operation pendant 30 is granted to the user terminal 50. The viewing right only allows viewing of the display screen of the operation pendant 30. When the viewing right is granted to the user terminal 50, the same screen as the display screen of the operation pendant 30 is displayed on the user terminal 50. The user can grasp the operation contents of the operation pendant 30 through the display screen of the operation pendant 30 displayed on the user terminal 50.

The operation pendant 30 connected to the control device 40 is free from the limitation of the control range of the control device 40. In the present embodiment, the operation pendant 30 can be regarded as being granted the first control right.

Figure 4:
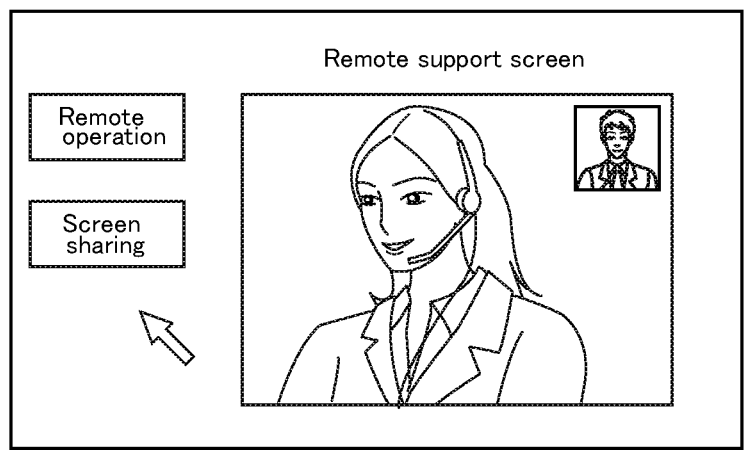
FIG. 4 is a screen for selecting a mode of connection of a technician terminal, which is displayed on the user terminal shown in FIG. 1.

FIG. 4 shows an example of a remote support screen displayed on the user terminal 50 when a remote operation application is executed. On the remote support screen, an area for displaying video captured by a camera mounted on the user terminal 50, an area for displaying video captured by a camera mounted on the technician terminal 60, a remote operation button, and a screen sharing button are displayed.

When the remote operation button is clicked by the user, the mode of connection with the technician terminal 60 is set to remote operation, and the authority to operate the user terminal 50 (operation right) is transferred to the technician side. The technician can remotely operate the user terminal 50 by operating an operation device, such as a mouse or a keyboard, of the technician terminal 60.

When the screen sharing button is clicked by the user, the mode of connection with the technician terminal 60 is set to screen sharing, and the authority to view the display screen of the user terminal 50 (viewing right of the user terminal 50) is transferred to the technician side. By viewing the display screen of the user terminal 50 displayed on the display screen of the technician terminal 60, the technician can confirm the status of the operation on the user terminal 50 by the user.

Remote support service using the remote support system 1 according to the present embodiment will be described with reference to FIG. 5, FIG. 6, and FIG. 7.

Figure 5:
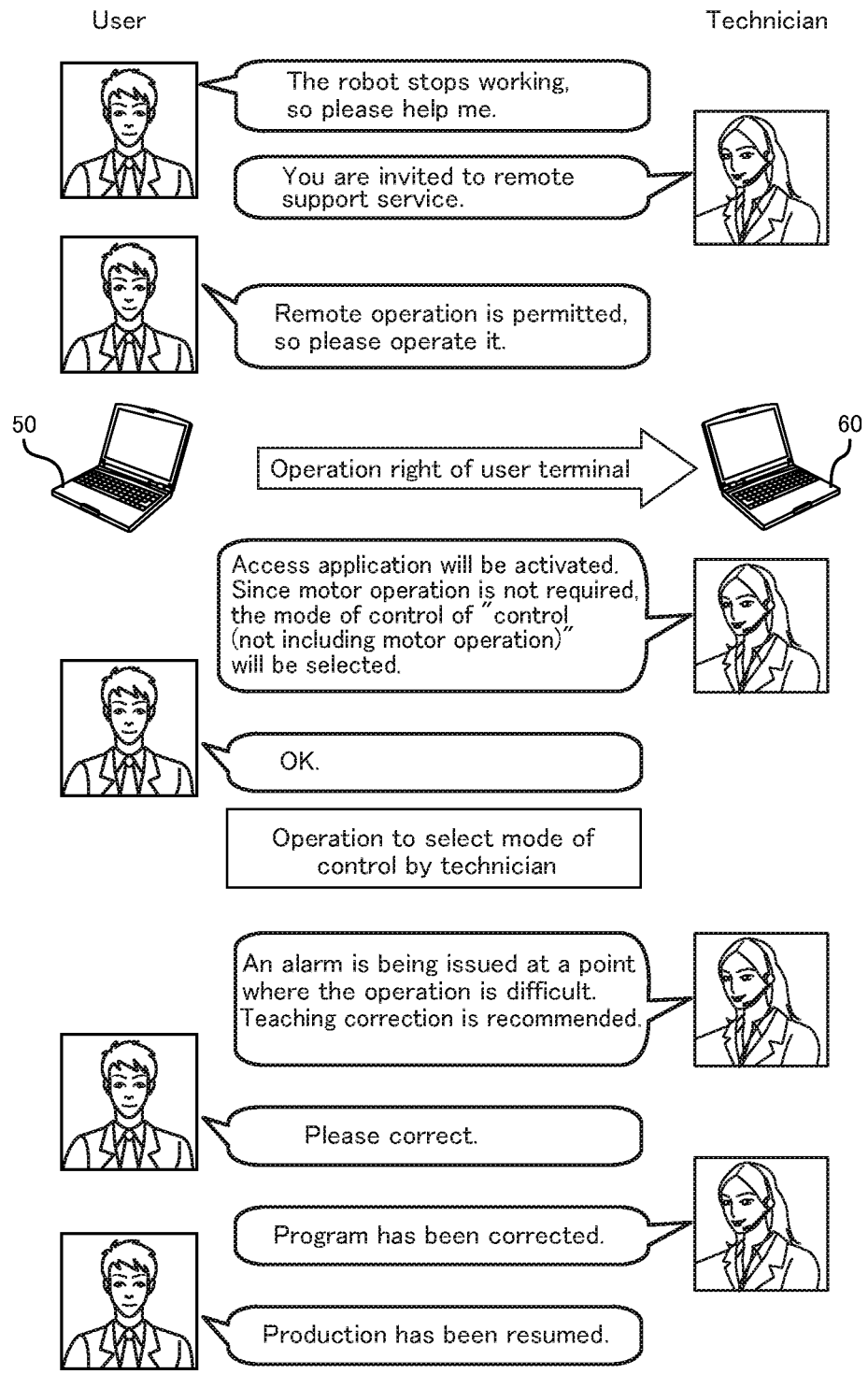
FIG. 5 is a diagram showing an example of remote support service using the remote support system shown in FIG. 1.

FIG. 5 shows a case where the user transfers the operation right of the user terminal 50 to the technician side before selecting the mode of control of the control device 40 at the user terminal 50. As shown in FIG. 5, when a problem occurs, such as the operation of the robot arm mechanism 10 stopping, the user makes an inquiry to a technician using e-mail, telephone, chat, and other means. The technician receives the inquiry and sends an invitation mail to the remote support service to the user terminal 50. When the user clicks the URL included in the body of the received invitation mail, the remote support application is activated on the user terminal 50, and a remote support screen as shown in FIG. 4 is displayed. The user can consult with the technician on the remote support screen about the status of the problem and the solution.

When the user does not seem to be able to solve the problem by his/her own operation, or when he/she accepts the offer of remote operation from the technician, the user clicks the remote operation button on the remote support screen. The operation right of the user terminal 50 is thereby transferred to the technician side, and the technician can remotely operate the user terminal 50 via the technician terminal 60.

The technician remotely operates the user terminal 50 to activate the access application. A screen for selecting a mode of control of the control device 40 as shown in FIG. 3 is displayed on the user terminal 50. The technician remotely operates the user terminal 50 and clicks "control (not including motor operation)" as the mode of control. The second control right is thereby granted to the user terminal 50. The technician can remotely operate the user terminal 50 to access the control device 40, perform operations within the range defined by the second control right, and investigate the cause of the problem that has occurred in the robot system. Once the cause of the problem is identified, the technician performs correcting or changing work, such as a change of setting information or a correction of a task program. After the correcting or changing work by the technician has been completed, the user actually operates the robot system to confirm that the problem has been solved.

Figure 6:
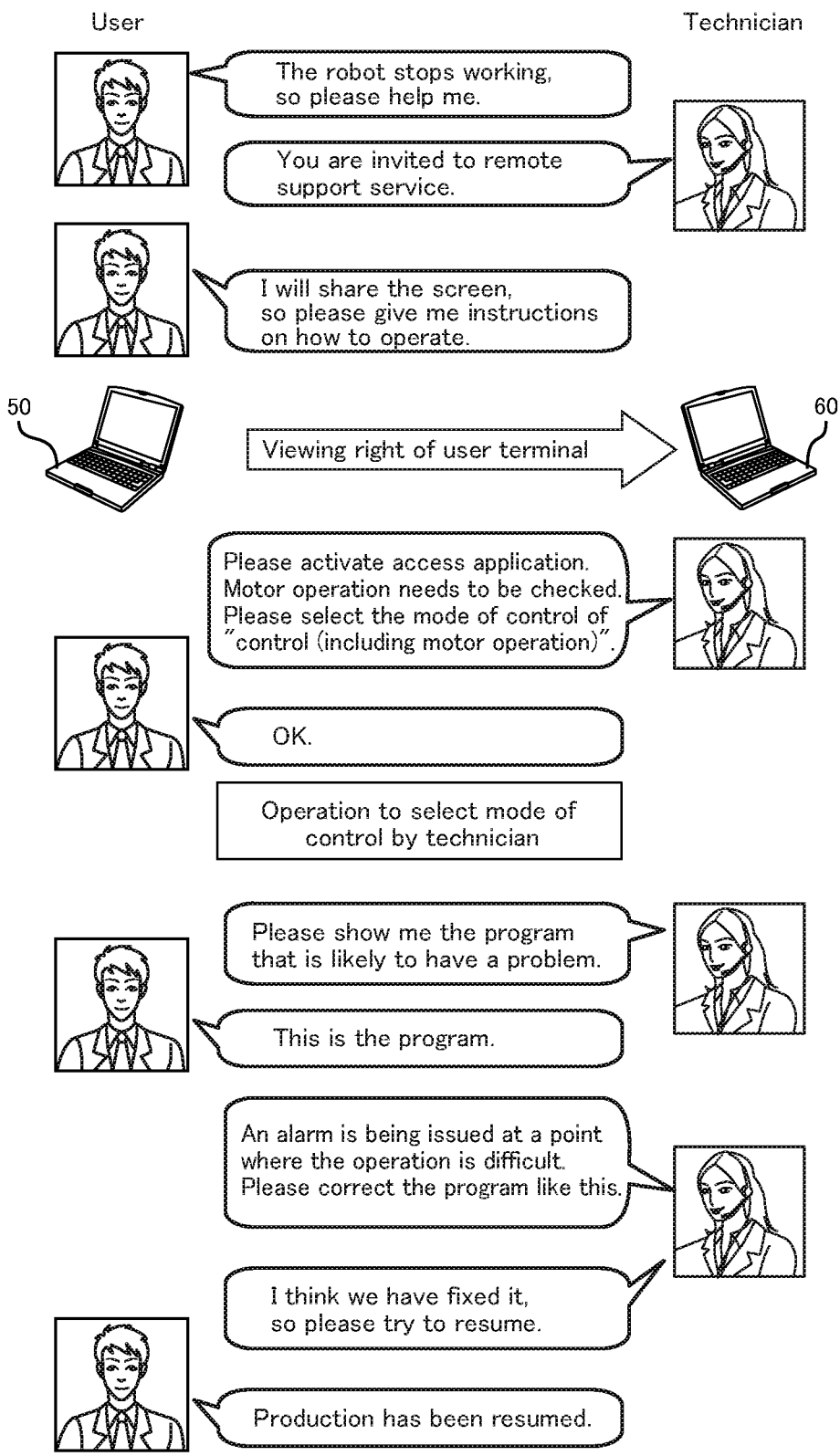
FIG. 6 is a diagram showing another example of the remote support service using the remote support system shown in FIG. 1.

FIG. 6 shows a case where the viewing right of the user terminal 50 is transferred to the technician. The user clicks the screen sharing button on the remote support screen when the user does not want the technician to operate the user terminal 50 or when the user accepts the offer of screen sharing from the technician. The viewing right of the user terminal 50 is thereby transferred to the technician side, and the technician can view the display screen of the user terminal 50 via the technician terminal 60 and confirm the user operation on the user terminal 50.

The user operates the user terminal 50 and activates the access application in accordance with an instruction from the technician. The screen for selecting a mode of control of the control device 40 as shown in FIG. 3 is displayed on the user terminal 50. The user clicks "control (including motor operation)" as the mode of control in accordance with an instruction from the technician. The first control right is thereby granted to the user terminal 50. The user can operate the user terminal 50 to access the control device 40 and perform operations within a range defined by the first control right. The technician investigates the cause of the problem that has occurred in the robot system while instructing the user to operate the user terminal 50 or giving instructions by marking or the like on the shared screen. When the cause of the problem is identified, the technician instructs the user to change a parameter, correct a program, or the like, and the user operates the user terminal 50 in accordance with the correction or change instruction from the technician. After the correcting or changing operation has been completed, the user actually operates the robot system to confirm that the problem has been solved.

Figure 7:
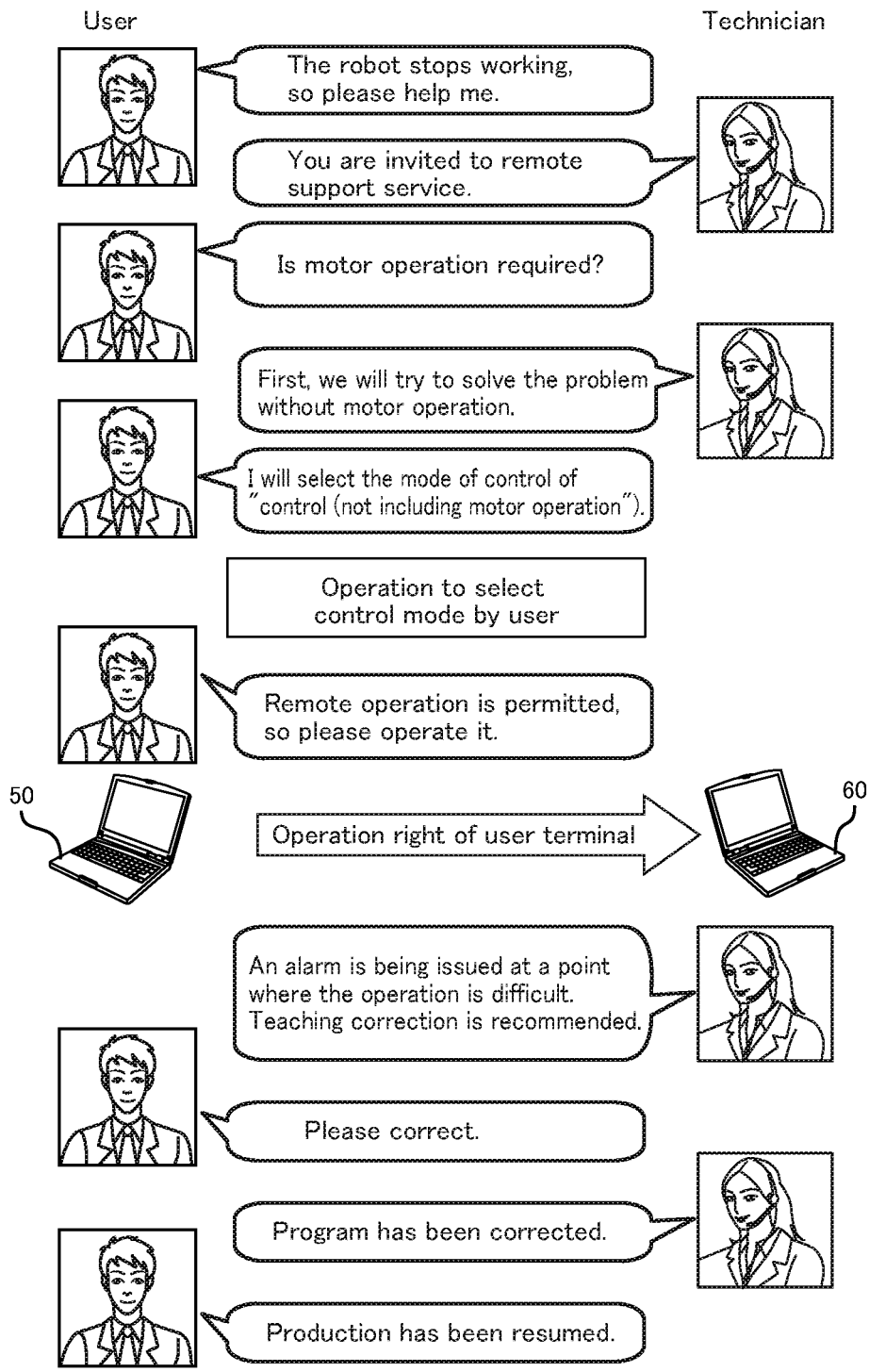
FIG. 7 is a diagram showing another example of the remote support service using the remote support system shown in FIG. 1.

FIG. 7 shows a case where the user operates the user terminal 50 to activate the access application, select the mode of control, and then transfer the operation right of the user terminal 50 to the technician side. As shown in FIG. 7, before clicking the remote operation button on the remote support screen, the user activates the access application and clicks "control (not including motor operation)" as the mode of control on the screen for selecting a mode of control (see FIG. 3) displayed on the user terminal 50. The second control right is thereby granted to the user terminal 50. After selecting the mode of control, the user clicks the remote operation button on the remote support screen. The operation right of the user terminal 50 is thereby transferred to the technician side. The technician can remotely operate the user terminal 50 to access the control device 40, perform operations within the range defined by the second control right, and investigate the cause of the problem that has occurred in the robot system. The steps from when the technician remotely operates the user terminal 50 and solves the problem until when the user actually operates the robot system and confirms that the problem has been solved are the same as those described with reference to FIG. 5.

According to the remote support system 1 of the present embodiment, not the control device 40 but the user terminal 50 connected to the control device 40 is connected to the technician terminal 60 via the external network 100. The security level against the external network 100 mainly depends on the user terminal 50. Therefore, when the user terminal 50 has a sufficient security function, the control device 40 does not need to have a special security function for connecting to the external network 100, and it is possible to prevent the intrusion of a third party into the control device 40 due to utilization of the remote support service and to suppress the risk of information leakage from the control device 40 to the outside. This lowers the barrier to using remote support service.

Further, since the function of a general existing application can be used in the step of transferring the operation right or the viewing right of the user terminal 50 to the technician side, a special application only for using the remote support service is not required. This eliminates the cost of developing such a special application. Because an existing application can be used, setting for connecting the user terminal 50 to the technician terminal 60 is simple, and the barrier for users to use the remote support service is fairly low.

Further, since the operation right of the user terminal 50 is transferred to the technician side with the consent of the user, the technician side does not forcibly acquire the operation right of the user terminal 50. The user can also view, on the display screen of the user terminal 50, how the user terminal 50 is remotely operated by the technician. Since the user terminal 50 is remotely operated by the technician under user's supervision, it is possible to avoid the situation in which the user terminal 50 is illegally operated by the technician.

If the user is concerned that the user terminal 50 may be illegally operated by the technician, as described with reference to FIG. 6, instead of transferring the operation right of the user terminal 50 to the technician side, the user may transfer the viewing right of the user terminal 50 to the technician side and operate the user terminal 50 by himself/herself in accordance with instructions from the technician. Alternatively, as described with reference to FIG. 7, the access application may be activated and the mode of control may be selected, before transferring the operation right of the user terminal 50 to the technician. As a result, the mode of control is already selected when the technician is enabled to remotely operate the user terminal 50. The technician can only perform the controls (operations) specified in the mode of control selected by the user. Therefore, there is no concern that operations outside the control range intended by the user will be input to the control device 40. Since the technician only remotely operates the control page after the mode of control is selected, the opportunity for the technician to view the top screen of the user terminal 50 or access other applications installed in the user terminal 50 can be reduced, and the security of the user terminal 50 against the technician can be ensured.

The remote support system 1 according to the present embodiment has three modes of control with different control ranges for the control device 40, and has two modes of connection for the connection between the user terminal 50 and the technician terminal 60. The operation to select each mode can be performed on the user terminal 50. Therefore, if the mode of control is selected in advance before transfer of the operation right of the user terminal 50 to the technician side, the technician can only perform the controls (operations) permitted in the mode of control even when accessing the control page. If the user does not want the technician to remotely operate the user terminal 50, the user may transfer the viewing right of the user terminal 50 to the technician side and operate the user terminal 50 by himself/herself while receiving instructions from the technician. In this manner, the user can substantially limit the range of control of the control device 40 by the technician, depending on the type of mode of control he/she selects. Further, the user can arbitrarily set the security level against the technician by the timing of selecting the mode of control, the type of the mode of control to be selected, the timing of selecting the mode of connection, and the type of the mode of connection to be selected. As a result, it is possible to prevent both the illegal operation on the control device 40 and the illegal operation on the user terminal 50 by the technician.

The modes of control that can be selected by the user include a mode of control that does not include control of motor operation. During the remote operation of the user terminal 50 by the technician, the technician is not on site; therefore, it is difficult for the technician to confirm the situation around the robot arm mechanism 10. If the robot arm mechanism 10 is moved in a situation in which there are workers and obstacles around the robot arm mechanism 10, the robot arm mechanism 10 collides with the workers or obstacles. Therefore, the presence of the mode of control that does not include control of motor operation makes it possible to avoid a situation in which a motor is driven by the technician at a timing not intended by the user, causing the robot arm mechanism 10 to move. As a result, remote support service provided by technicians who are not on site can be used without concern.

Figure 8:
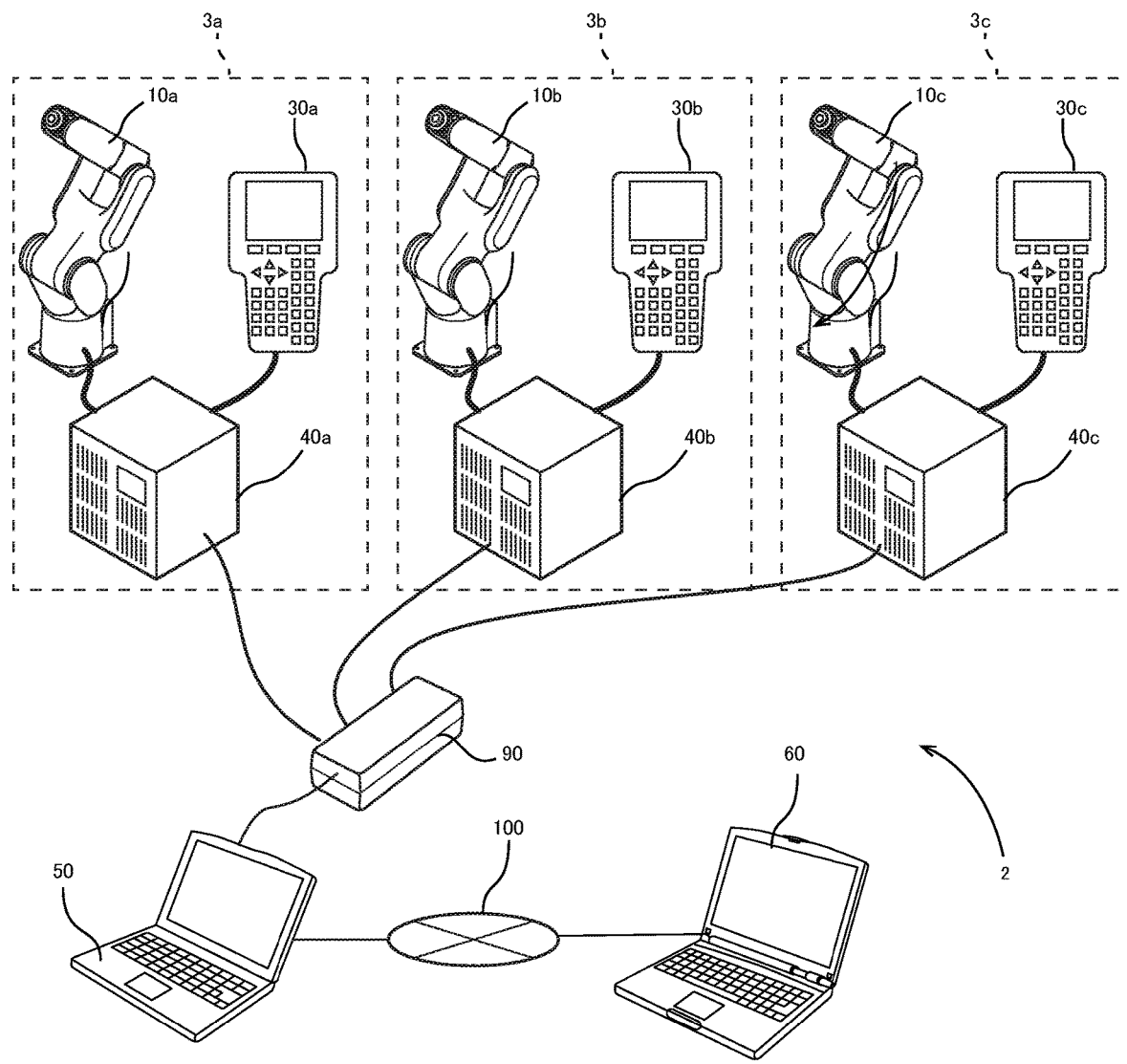
FIG. 8 is a diagram showing another example of the remote support system according to the present embodiment.

In the remote support system 1 according to the present embodiment, the user terminal 50 is connected to a single control device 40. However, a plurality of control devices 40 may be connected to the user terminal 50. A remote support system 2 shown in FIG. 8 includes a plurality of robot systems 3 (3a, 3b, and 3c). The user terminal 50 is connected to a plurality of control devices 40 (40a, 40b, and 40c) via a relay device 90. The user activates the access application on the user terminal 50 and designates a control device to be controlled, whereby the control device connected to the user terminal 50 via the relay device 90 is switched and the user can access the designated control device. Thus, even if the remote support system includes a plurality of control devices 40, it has the same effect as the configuration with a single control device 40.

The remote support system 1 according to the present embodiment has three modes of "control (including motor operation)", "control (not including motor operation)", and "monitor" as modes of control of the control device 40, and the control range of the control device 40 by the user terminal 50 is limited according to the mode of control selected by the operation of the user terminal 50. As a result, the range of control of the control device 40 by the technician who remotely operates the user terminal 50 can be substantially limited. However, the mode of control is not limited to these as long as the range of control of the control device 40 by the user terminal 50 can be limited. The modes of control may be only one or two of these, or four or more. Although the mode of control is determined in advance in the present embodiment, the mode of control may be set at the user terminal 50. Accordingly it is possible to reduce the risk that the technician who remotely operates the user terminal performs operations contrary to the user's intention.

In the remote support system 1 according to the present embodiment, two input devices, the operation pendant 30 and the user terminal 50, are connected to the control device 40. When inputs from two input devices are received, the correcting or changing work may become complicated. In addition, when inputs of operation commands are received at the same time, an unexpected operation may be performed. For this reason, it is desirable that the control device 40 is configured to, while receiving an input from one input device, disallow an input from the other input device, thereby limiting the number of input devices from which the correction or change operation is received to one. For example, the control device 40 denies access to the control device 40 by the user terminal 50 while the operation pendant 30 is accessing the control device 40.

The mode of control of the control device 40 by the operation pendant 30 may be automatically set according to the mode of control selected at the user terminal 50. For example, when the mode of control including control of motor operation is selected at the user terminal 50, the mode of control not including control of motor operation is automatically set for the operation pendant 30. Thereby, high risk robot operations can be received only from one of the input devices.

In addition, in order to avoid a situation in which the connection is lost during correction or change and the data being corrected or changed is reflected halfway through the correction or change or the data being corrected or changed is damaged, it is desirable to reflect the corrected or changed data when the correction or change has been completed. Therefore, the control device 40 is configured to accept a correction or change to a copy of the original data when a correction or change operation is initiated, and to overwrite the original data with the corrected or changed data when the correction or change has been completed.

FIG. 5 to FIG. 7 illustrate examples in which the user selects modes of control in which the user terminal 50 can operate the control device 40. However, when the user wants the technician to see the operation on the operation pendant 30 or wants to view the operation on the operation pendant 30 by a worker on site together with the technician, the user may select "monitor" as the mode of control. When "monitor" is selected as the mode of control, and the viewing right or the operation right of the user terminal 50 is granted to the technician terminal 60, the same screen as the display screen of the operation pendant 30 is displayed on the technician terminal 60. The worker on site can operate the operation pendant 30 while receiving instructions from the technician who is viewing the screen of the operation pendant 30 displayed on the technician terminal 60. In the present embodiment, the operation pendant 30 is connected to the control device 40, but since the control device 40 can be controlled via the user terminal 50, the operation pendant 30 does not necessarily have to be connected to the control device 40.

The user terminal 50 is equipped with an imaging means 51 such as a camera so that, when the technician operating the technician terminal 60 remotely controls the user terminal 50 to solve the problem of the system, the technician can actually visually confirm the on-site situation, such as under what circumstances the system has stopped and what system error indication is displayed (see FIG. 1). The image or video captured by the imaging means 51 is transmitted to the technician terminal 60 by the remote support application of the user terminal 50. Of course, it may be transmitted to the technician terminal 60 by another application. The technician can request the user for a portion the technician wishes to visually confirm, and deal with the problem of the system while confirming the image or video captured by the imaging means 51 provided in the user terminal 50. This improves the workability of the support work by the technician. Of course, the imaging means 51 may be configured separately from the user terminal 50, or may be provided in the operation pendant 30.

Further, the user terminal 50 may be equipped with a sound recording means (not shown) such as a microphone so that the technician can actually hear the sound of industrial machines such as the robot arm mechanism 10 during standby, operation, and the like. The sound data recorded by the sound recording means is transmitted to the technician terminal 60 by the remote support application of the user terminal 50. Of course, it may be transmitted to the technician terminal 60 by another application. The technician can deal with the problem of the system while confirming the sound recorded by the sound recording means provided in the user terminal 50. This improves the workability of the support work by the technician. Of course, the sound recording means may be configured separately from the user terminal 50, or may be provided in the operation pendant 30.

Figure 9:
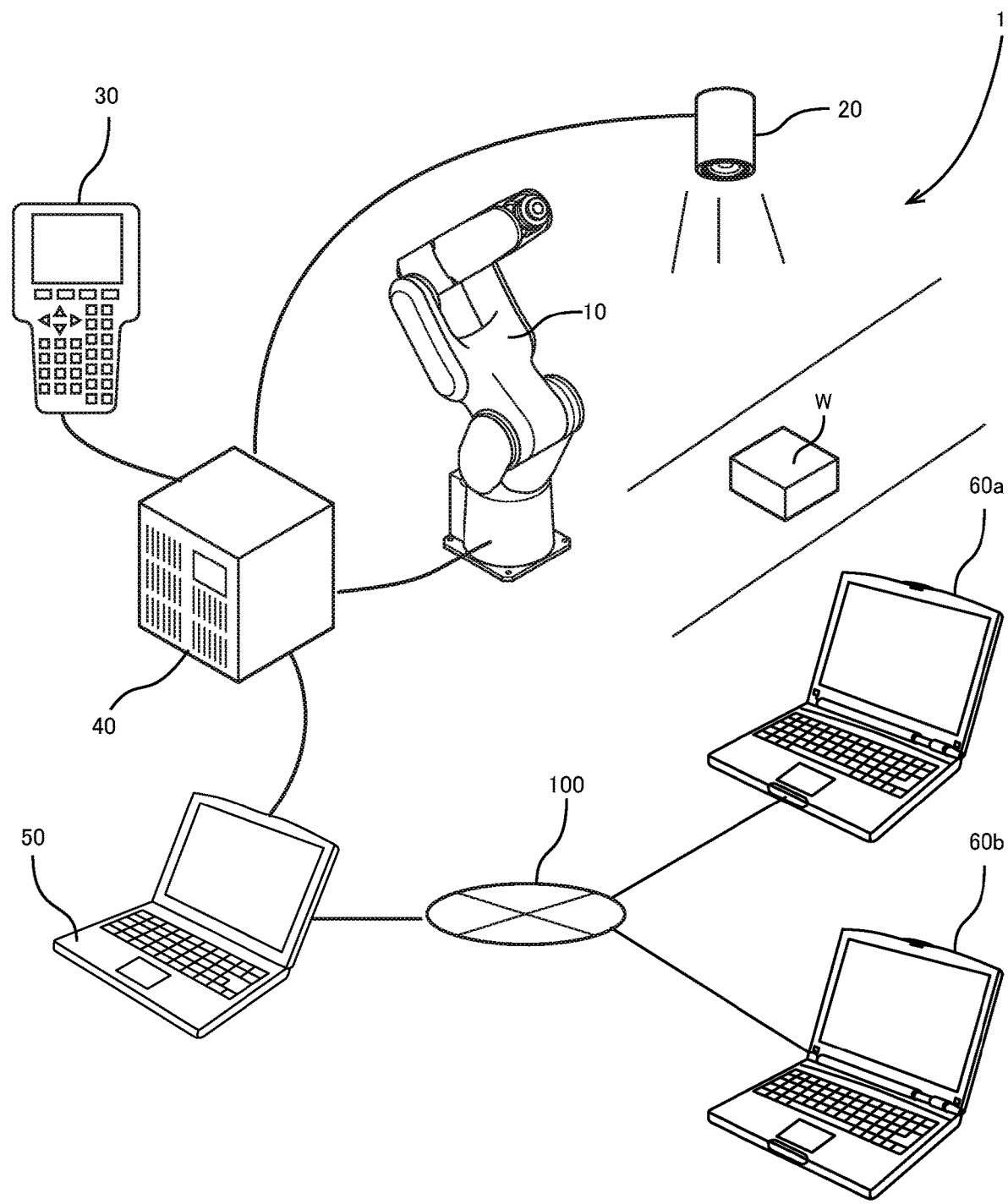
FIG. 9 is a diagram showing a first modification of the remote support system according to the present embodiment.

Assuming a case where a plurality of technicians deal with a trouble of a customer, a plurality of technician terminals 60 may be connected to the user terminal 50. As shown in FIG. 9, two technician terminals 60 (60*a* and 60*b*) are connected to the user terminal 50. In order to prevent the remote operation of the user terminal 50 from becoming complicated, it is desirable that the operation right of the user terminal 50 can be granted to only one technical terminal 60*a* of the two technician terminals 60*a* and 60*b*. For example, the operation right can be granted to the technician terminal 60*a* based on the fact that one technician terminal 60*a* is designated and then the remote operation button is clicked by user operation on the remote support screen displayed on user terminal 50. At this time, the viewing right is automatically granted to the other technician terminal 60*b*. On the other technician terminal 60*b*, how the user terminal 50 is remotely operated by the technician terminal 60*a* can be confirmed. This enables a plurality of technicians to share information and efficiently deal with maintenance and problems. Of course, the viewing right may be granted to the other technician terminal 60*b* based on the fact that the other technician terminal 60*b* is designated and then the screen sharing button is clicked by user operation on the remote support screen displayed on the user terminal 50. Similarly, when three or more technician terminals 60 are connected to the user terminal 50, it is desirable that the operation right can be granted to only one of the three or more technician terminals 60.

Figure 10:
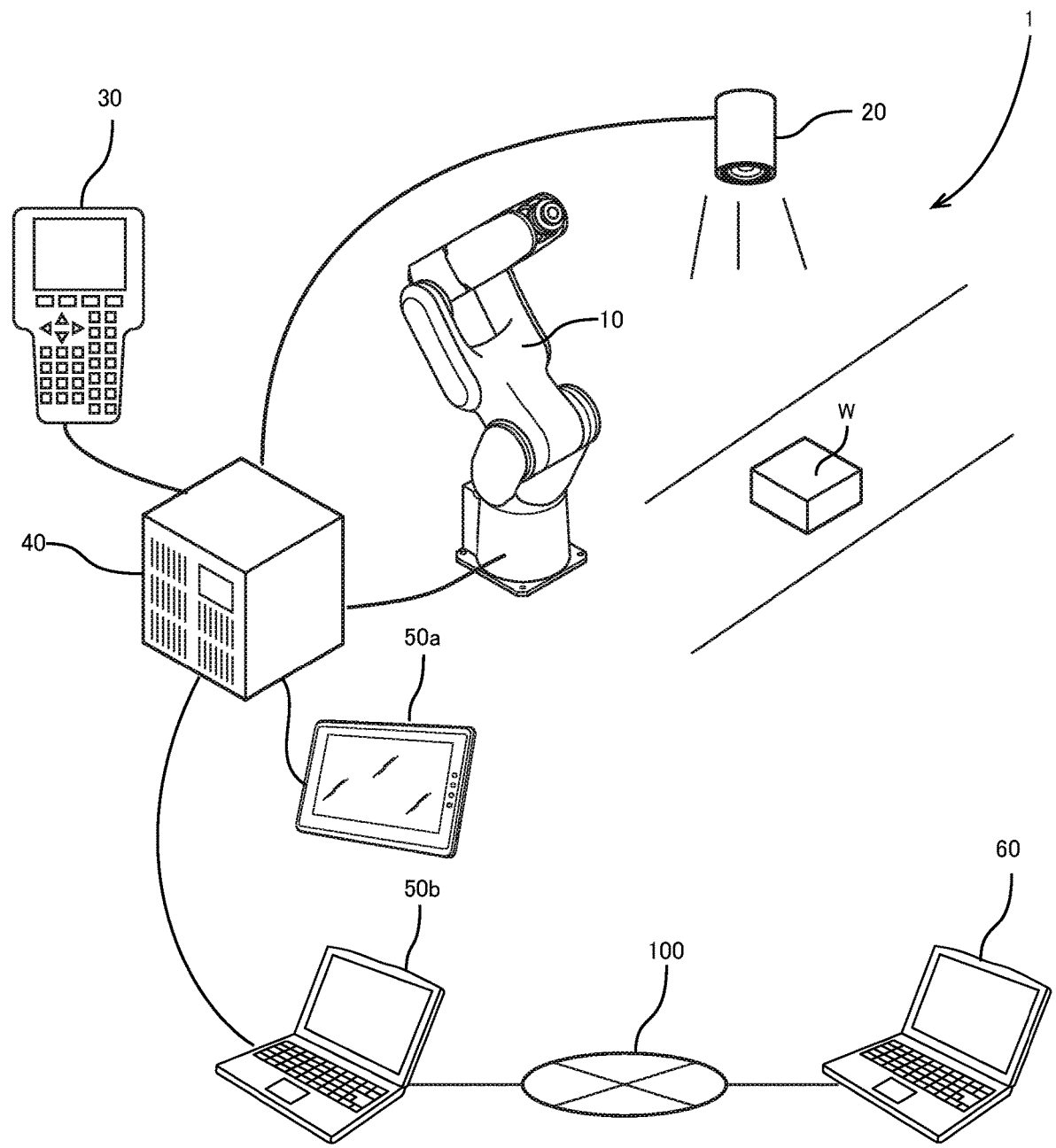
FIG. 10 is a diagram showing a second modification of the remote support system according to the present embodiment.

Assuming that there are a plurality of users working on site, a plurality of user terminals 50 may be connected to the control device 40. The user terminal 50 may be an information processing terminal, such as a smartphone or a tablet, instead of a PC. As shown in FIG. 10, two user terminals 50 (50*a* and 50*b*) are directly connected to the control device 40 by cables or the like. Of course, the user terminals 50 may be connected to the control device 40 wirelessly via an internal network including the control device 40. In order to prevent the control operation of the control device 40 from becoming complicated, it is desirable that only one user terminal 50*a* of the two user terminals 50*a* and 50*b* be able to control the control device 40. For example, while the user terminal 50*a* is accessing the control page, the user terminal 50*b* is not able to access the control page, or even if the user terminal 50*b* is able to access the control page, the user terminal 50*b* is not able to perform operation on the control page. Of course, if three or more user terminals 50 are connected to the control device 40, it is desirable that only one of the user terminals 50 be able to control the control device 40. However, this does not deny that, when a plurality of user terminals 50 are connected to the control device 40, the plurality of user terminals 50 simultaneously control the control device 40.

Figure 11:
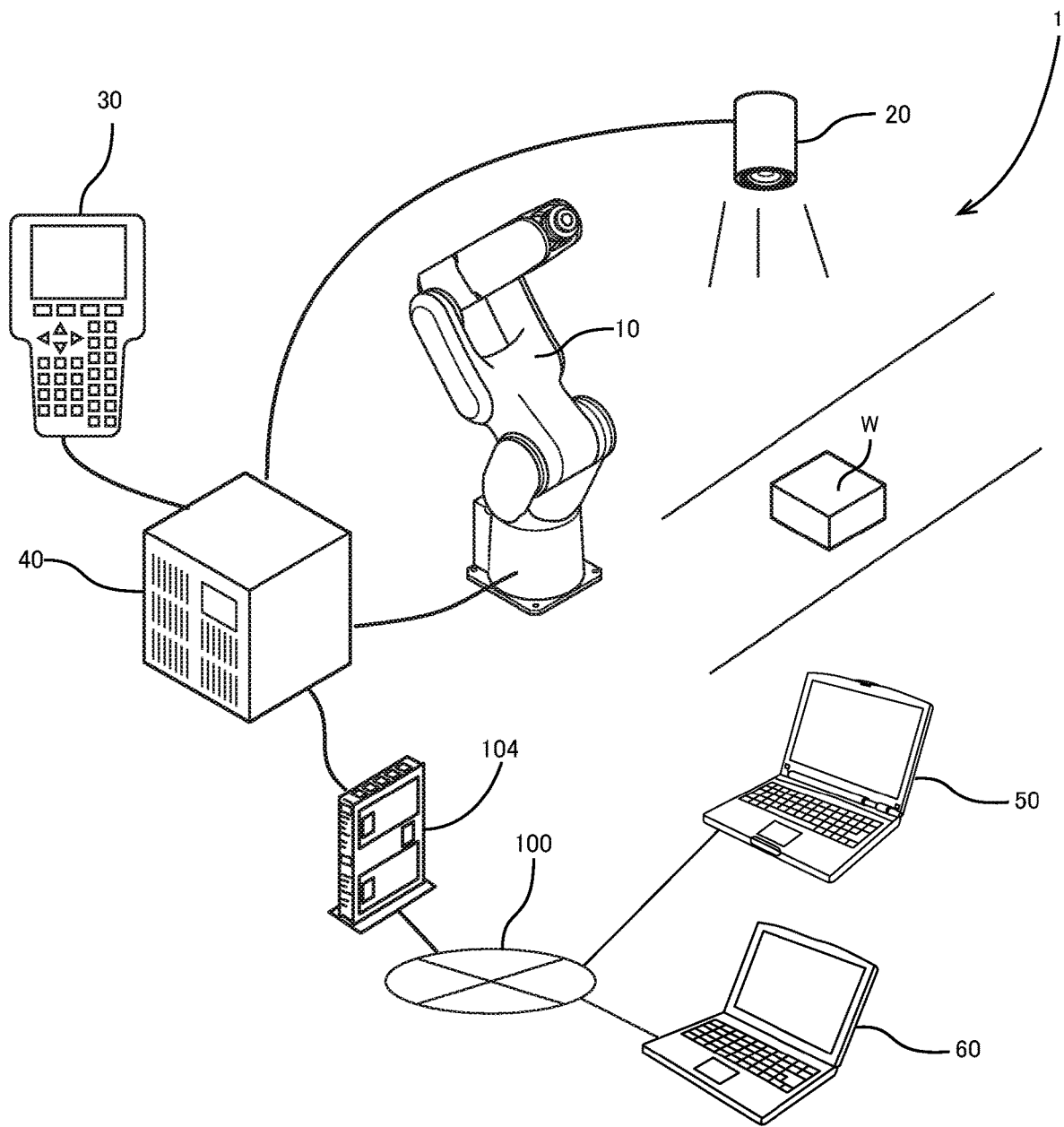
FIG. 11 is a diagram showing a third modification of the remote support system according to the present embodiment.

In the resent embodiment, it is assumed that a user on site receives remote support by connecting the user terminal 50 to the control device 40 by a wired cable. However, the user himself/herself may be in a remote location. Assuming such a case, as shown in FIG. 11, the control device 40 may be connected to a network device 104, such as a router, by wire or wirelessly via a local area network, and the user terminal 50 may access the control device 40 via an external network 100 such as the Internet.

In the present embodiment, the control targets are the robot arm mechanism 10 and the camera 20. However, the control target may be industrial machines, such as a machine tool, an injection molding machine, and other computer numerical control (CNC) controlled machines. The machine tool here includes a cutting machine, an electric discharge machine, a laser machine, an ultra-precision machine, and the like. The CNC controlled machine includes a forging machine, a conveyor, a stocker, a cloth cutter, and the like. Of course, the control target may be one of these industrial machines or a system in which two or more of them are combined.

Figure 12:
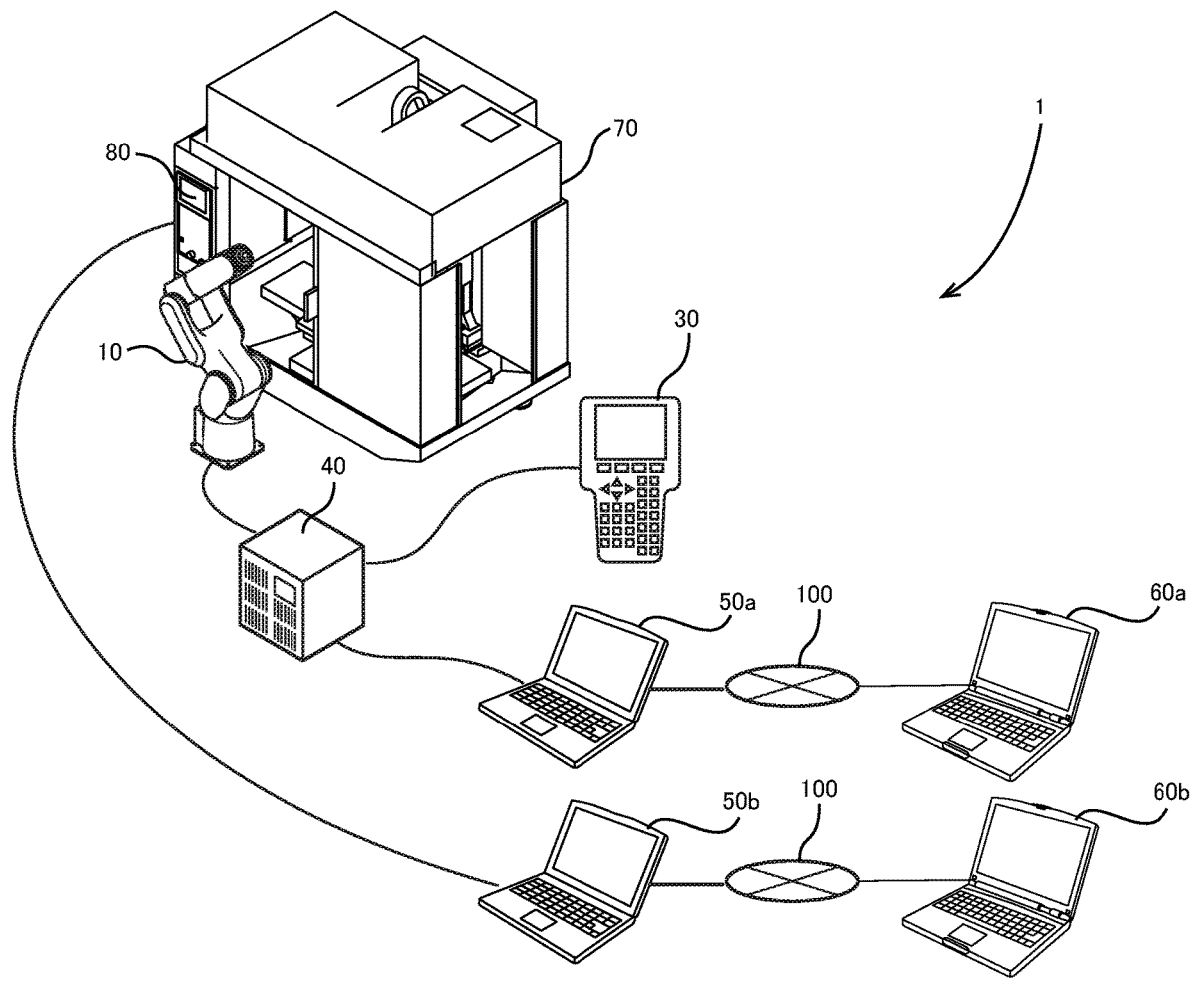
FIG. 12 is a diagram showing a fourth modification of the remote support system according to the present embodiment.

As shown in FIG. 12, in a machining system including a cutting machine 70 that machines a workpiece by cutting, and a robot arm mechanism 10 that is disposed at a position close to the cutting machine 70 and supplies the workpiece before machining to the cutting machine 70 and carries out the workpiece after machining from the cutting machine 70, the cutting machine 70 and the robot arm mechanism 10 are the control targets. The user terminal 50a is connected to the control device 40 that controls the robot arm mechanism 10 by a wired cable, and the technician terminal 60a is connected to the user terminal 50a via the external network 100 in such a manner that data communication is possible. The user terminal 50b is connected to a cutting machine control device 80 that controls the cutting machine 70 by a wired cable, and the technician terminal 60b is connected to the user terminal 50b via the external network 100 in such a manner that data communication is possible.

The mode of control of the control device 40 (robot arm mechanism 10) by the user terminal 50a and the mode of control of the cutting machine control device 80 (cutting machine 70) by the user terminal 50b can be separately selected by operating the user terminals 50a and 50b. The user can transfer the operation right or the viewing right of the user terminal 50a to the technician terminal 60a by operating the user terminal 50a, and can transfer the operation right or the viewing right of the user terminal 50b to the technician terminal 60b by operating the user terminal 50b.

For example, the user can select a mode of control depending on the plurality of industrial machines to be controlled and depending on the on-site situation, such as selecting "control (including motor operation)" as the mode of control of the robot arm mechanism 10 by the user terminal 50a, and selecting "control (not including motor operation)" as the mode of control of the cutting machine 70 by the user terminal 50b. The user can also operate the user terminals 50a and 50b to select a support mode according to the industrial machine to be controlled and according to the skill level of the user who operates the user terminals 50a and 50b, such as granting the operation right of the user terminal 50a to the technician terminal 60a and granting the viewing right of the user terminal 50b to the technician terminal 60b. This makes it possible to manage both on-site safety and workability of the work of correcting or changing the setting data by remote control. By remotely operating the user terminal 50, technicians of a robot manufacturer or a maintenance company can correct or change information on the machining system. The information on the machining system includes information on the cutting machine 70 as well as information on the robot arm mechanism 10. The information on the cutting machine 70 includes task programs and setting information of the cutting machine 70.

In FIG. 12, two user terminals are connected to two industrial machines to be controlled. However, one user terminal may control two industrial machines to be controlled. For example, two industrial machines to be controlled may be communicatively connected to each other, a user terminal may be connected to one of the industrial machines and, via that industrial machine, the other industrial machine may be controlled. Of course, two industrial machines to be controlled may be connected to a single user terminal in such a manner that data communication is possible, and each of the two industrial machines may be controlled by the single user terminal.

Figure 13:
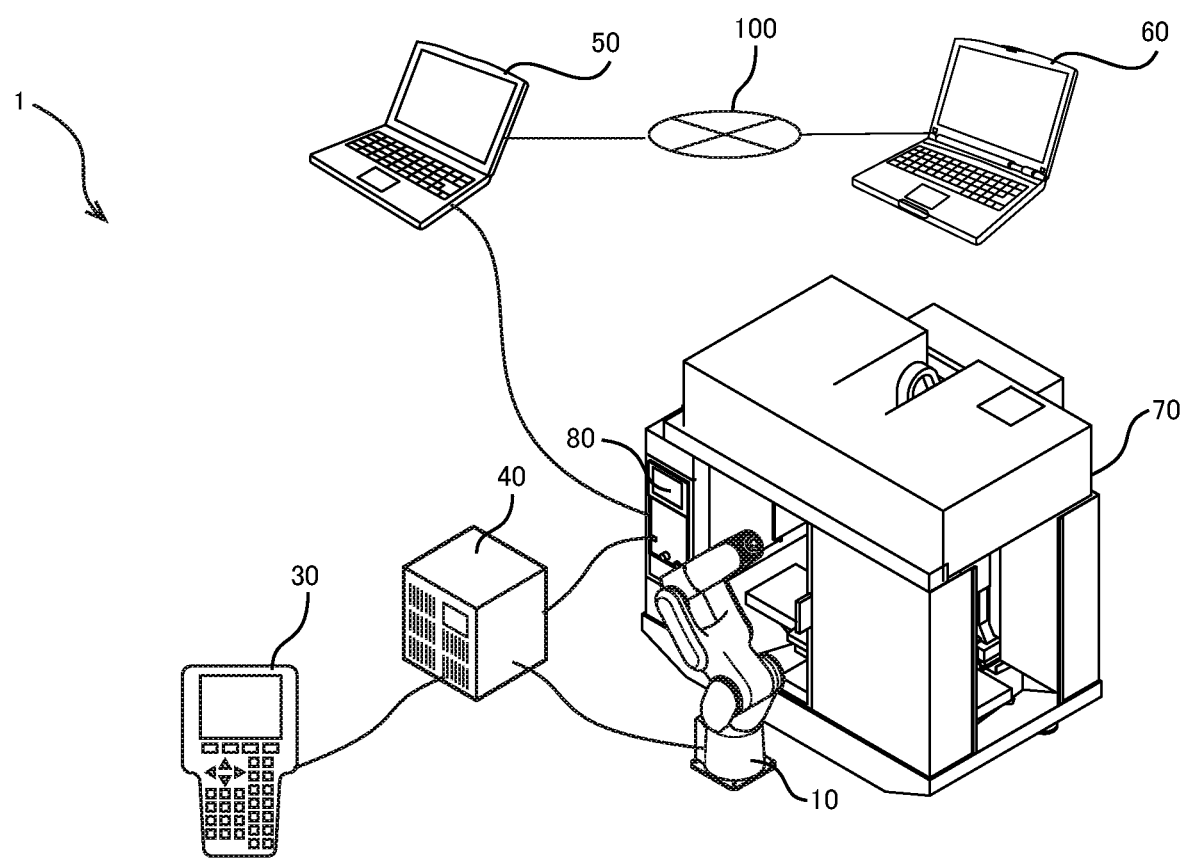
FIG. 13 is a diagram showing a fifth modification of the remote support system according to the present embodiment.

As shown in FIG. 13, a robot control device 40 that controls the robot arm mechanism 10 and a cutting machine control device 80 that controls the cutting machine 70 are connected in such a manner that data communication is possible, and the user terminal 50 is connected to the cutting machine control device 80 by a wired cable. The technician terminal 60 is connected to the user terminal 50 via an external network 100 such as the Internet in such a manner that data communication is possible. The user terminal 50 is connected to the robot control device 40 by a wired cable.

The mode of control of the robot control device 40 (robot arm mechanism 10) by the user terminal 50 and the mode of control of the cutting machine control device 80 (cutting machine 70) by the user terminal 50 may be set individually or collectively by operation of the user terminal 50. Since the modes of control can be set individually, it is possible to achieve both physical safety on site and safety in data management. Since the modes of control can be set collectively, the operation to select a mode of control can be easily performed, so that the workability of the work of correcting or changing data can be improved.

One feature of the remote support system 1 according to the present embodiment is that it includes the control device 40 that controls the robot arm mechanism 10 and the camera 20, the user terminal 50 connected to the control device 40, and at least one technician terminal 60 capable of remotely controlling the user terminal 50, and information held by the control device 40 can be corrected or changed by remotely controlling the user terminal 50 from the technician terminal 60. This allows technicians in remote locations to deal with problems of systems, such as those including the robotic arm mechanism 10 and the camera 20, without visiting the site.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A remote support system comprising:
a control device configured to control an industrial machine;
a first information processing terminal connected to the control device; and
one or more second information processing terminals capable of controlling the first information processing terminal, wherein
the control device is controllable from the one or more second information processing terminals,
the first information processing terminal has a control right of the control device,
the one or more second information processing terminals has an operation right to operate the first information processing terminal, and
a user who operates the second information processing terminal to which the operation right has been granted is able to control the control device by remotely operating the first information processing terminal.

2. The remote support system according to claim 1, wherein
the control device holds information on the industrial machine,
the operation right is granted to the one or more second information processing terminals based on an instruction from another user to the first information processing terminal in order to support correction or change of the information on the industrial machine via the first information processing terminal, and the user who operates the second information processing terminal to which the operation right has been granted is able to remotely operate the first information processing terminal within a control range of the control right.

3. The remote support system according to claim 1, wherein
the one or more second information processing terminals are connected to the first information.

4. The remote support system according to claim 1, wherein
the industrial machine includes at least one of a robot, a machine tool, an injection molding machine, and a CNC controlled machine.

5. The remote support system according to claim 1, wherein the operation right is granted to any one of the one or more second information processing terminals.

6. The remote support system according to claim 1, wherein
an operation right to operate the first information processing terminal or a viewing right to view a display screen of the first information processing terminal is granted to the one or more second information processing terminals based on an instruction from the user to the first information processing terminal, and
when the viewing right is granted to the one or more second information processing terminals, the user controls the control device by operating the first information processing terminal while receiving an instruction from the another user.

7. The remote support system according to claim 1, further comprising:
a camera configured to capture an image of a workpiece, wherein
the first information processing terminal has a control right of the control device and a control right of the camera,
the operation right is granted to the one or more second information processing terminals based on an instruction from the user to the first information processing terminal in order to support correction or change of information on the industrial machine and the camera by the user, and the another user is able to remotely operate the first information processing terminal within a control range of the control right of the control device and the control right of the camera, and is able to control the control device and the camera via the first information processing terminal based on an instruction from the another user to the one or more second information processing terminals.

8. The remote support system according to claim 1, wherein
the control right includes a first control right including a right to control driving of the industrial machine by a power source and a second control right not including the right to control driving of the industrial machine by the power source,
the control device includes an operation device dedicated to the industrial machine, the operation device has the first control right, and
the first information processing terminal has the first control right or the second control right based on an instruction from the user.

9. The remote support system according to claim 1, wherein the control device includes an operation device dedicated to the industrial machine.

10. The remote support system according to claim 8, wherein the first information processing terminal or the operation device is unable to control the control device while the operation device or the first information processing terminal is controlling the control device.

11. The remote support system according to claim 8, wherein when receiving a signal indicating that correction of a program held by the control device by the operation device or the first information processing terminal is complete, the control device reflects the corrected program.

12. The remote support system according to claim 8, wherein
one of the dedicated operation device and the first information processing terminal includes an imaging means, and
an image or video captured by the imaging means is transmitted to the second information processing terminal in order to support correction or change of the information on the industrial machine.

13. The remote support system according to claim 8, wherein the first information processing terminal or the one or more second information processing terminals are able to display a same screen as a screen that can be displayed by the dedicated operation device.

14. The remote support system according to claim 1, comprising a plurality of the control devices, and further comprising a relay device configured to relay data transmission between each of the control devices and the first information processing terminal, wherein
the relay device switches the control device connected to the first information processing terminal based on a switching command from the first information processing terminal.

\* \* \* \* \*